(12) United States Patent
Ismert

(10) Patent No.: US 10,605,383 B2
(45) Date of Patent: Mar. 31, 2020

(54) MODULAR SUPPORT SYSTEM FOR PLUMBING CONNECTIONS

(71) Applicant: Dominic P. Ismert, Marshall, MI (US)

(72) Inventor: Dominic P. Ismert, Marshall, MI (US)

(*) Notice: Subject to any disclaimer, the term of this patent is extended or adjusted under 35 U.S.C. 154(b) by 82 days.

(21) Appl. No.: 16/023,619

(22) Filed: Jun. 29, 2018

(65) Prior Publication Data
US 2019/0003617 A1 Jan. 3, 2019

Related U.S. Application Data

(60) Provisional application No. 62/527,885, filed on Jun. 30, 2017.

(51) Int. Cl.
| | |
|---|---|
| *F16L 3/00* | (2006.01) |
| *F16L 5/10* | (2006.01) |
| *E03C 1/00* | (2006.01) |
| *E03C 1/22* | (2006.01) |
| *E03B 7/09* | (2006.01) |
| *F16L 3/22* | (2006.01) |
| *F16L 3/237* | (2006.01) |
| *F16L 3/24* | (2006.01) |
| *F16L 3/12* | (2006.01) |
| *E03C 1/122* | (2006.01) |
| *E03C 1/02* | (2006.01) |

(52) U.S. Cl.
CPC .............. *F16L 3/221* (2013.01); *F16L 3/237* (2013.01); *F16L 3/24* (2013.01); *E03C 1/021* (2013.01); *E03C 1/1222* (2013.01); *F16L 3/1222* (2013.01); *F16L 5/10* (2013.01)

(58) Field of Classification Search
CPC ... F16L 3/221; F16L 3/237; F16L 3/24; F16L 3/1222; F16L 5/10; F16L 5/14; E03C 1/1222; E03C 1/021
See application file for complete search history.

(56) References Cited

U.S. PATENT DOCUMENTS

| | | | |
|---|---|---|---|
| 5,025,944 A * | 6/1991 | Rodick | H02G 3/125 220/3.3 |
| 7,735,511 B1 * | 6/2010 | Ismert | F16L 5/10 137/360 |
| 7,798,458 B2 * | 9/2010 | Borbolla | H02G 3/086 248/300 |

(Continued)

*Primary Examiner* — Tan Le
(74) *Attorney, Agent, or Firm* — Polsinelli PC

(57) ABSTRACT

The presently disclosed technology generally provides a modular support system for plumbing connections. In one example, the system includes a frame, a connector that fits entirely in front of a support stud, and an optional housing. The frame includes symmetrical sides, each including a rail assembly. The connector includes first opposed sidewalls, each having a pair of boxways that receive the rails on any side of a frame unit to form a sliding joint between the frame and connector. Second opposed sidewalls include flexible tabs that engage frame corner flanges to prevent rearward disengagement of the connector from the frame. The housing includes structure for connection with the frame. The housing can be rotated for connection with the frame to receive vertical or horizontal plumbing lines. Connectors can connect the frame units in vertical or horizontal relation, or on either side of a building stud, or to brackets.

20 Claims, 11 Drawing Sheets

(56) References Cited

U.S. PATENT DOCUMENTS

| | | | | |
|---|---|---|---|---|
| 8,598,454 B2* | 12/2013 | Laughlin | ............... | H02G 3/081 |
| | | | | 174/53 |
| 9,388,555 B2* | 7/2016 | Whitehead | ............... | F25C 1/25 |
| 9,518,381 B2* | 12/2016 | Whitehead | .............. | E03C 1/021 |
| 9,834,914 B2* | 12/2017 | Ben Jacov | ................ | F16L 5/10 |
| 2015/0197924 A1* | 7/2015 | Whitehead | ............. | E03C 1/021 |
| | | | | 220/3.3 |
| 2015/0259891 A1* | 9/2015 | Ismert | ....................... | E03C 1/12 |
| | | | | 137/360 |
| 2018/0274213 A1* | 9/2018 | Brown | ................... | E03C 1/021 |

* cited by examiner

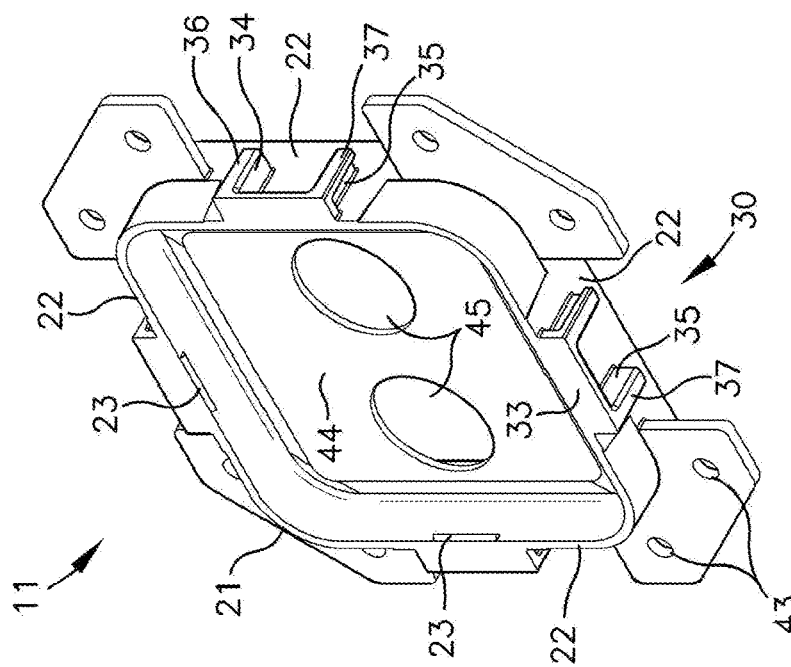
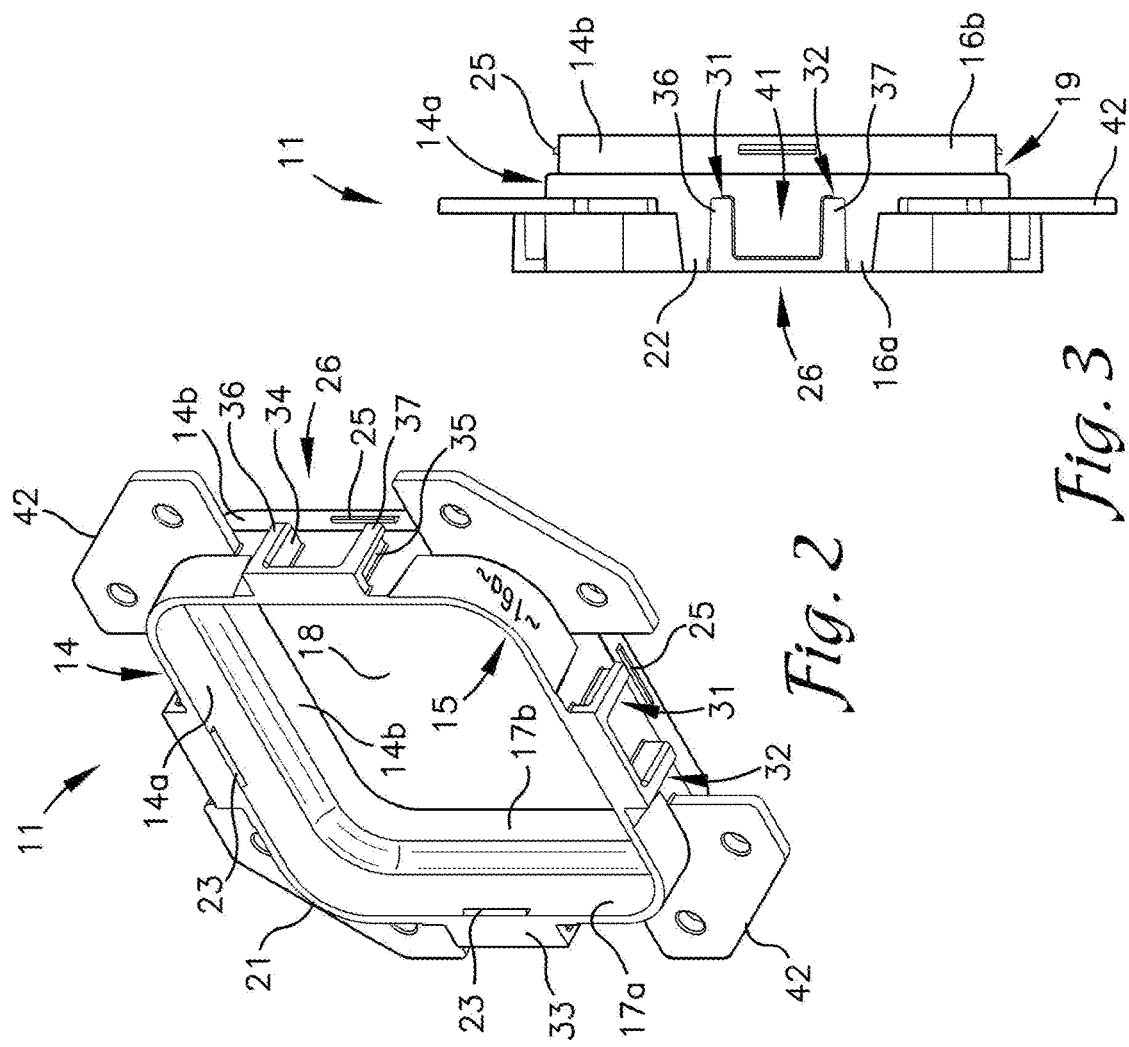

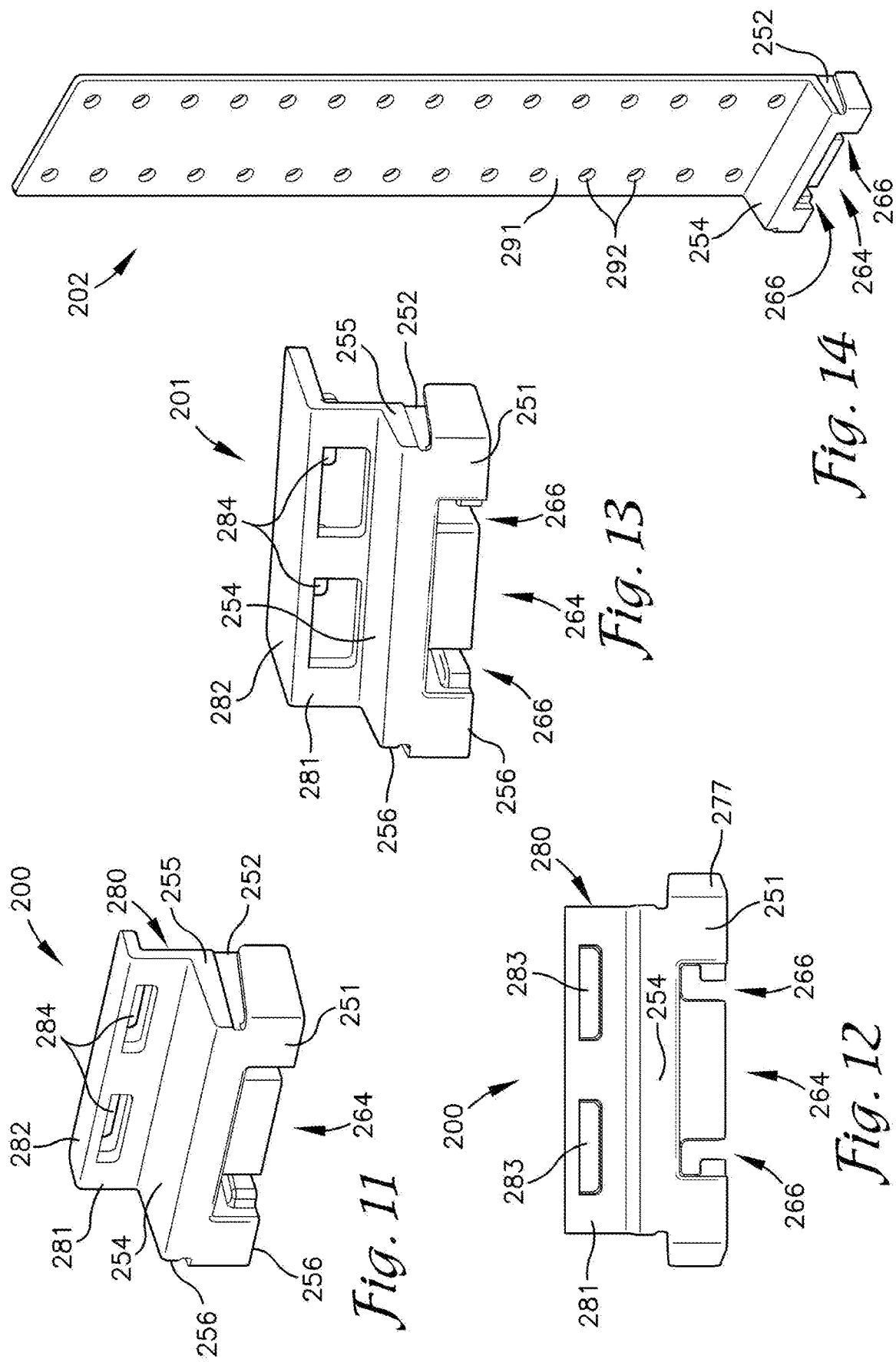

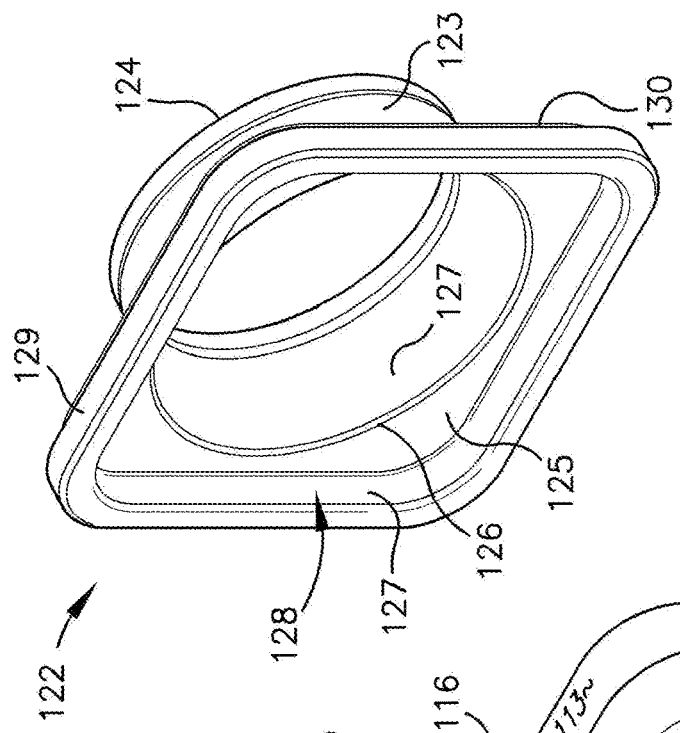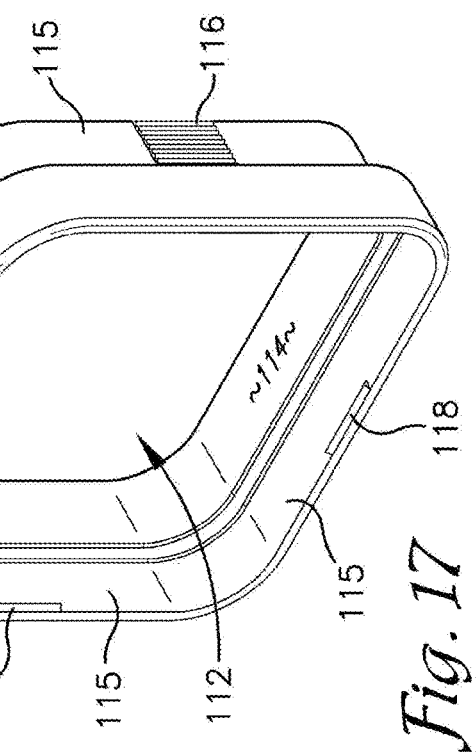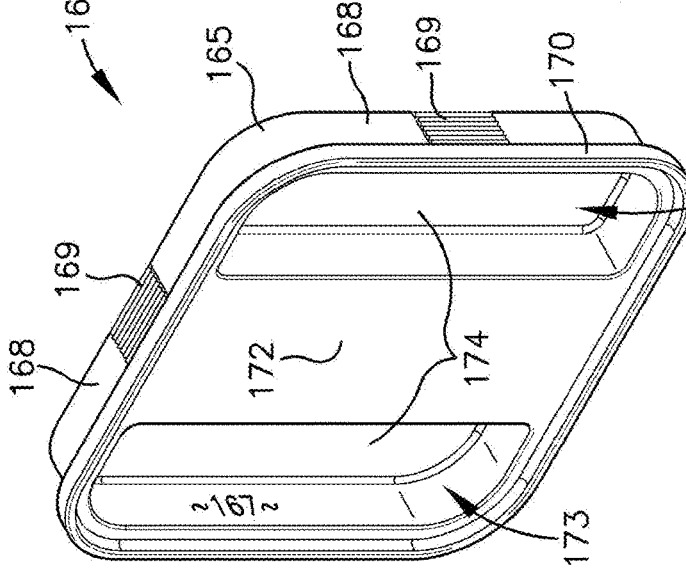

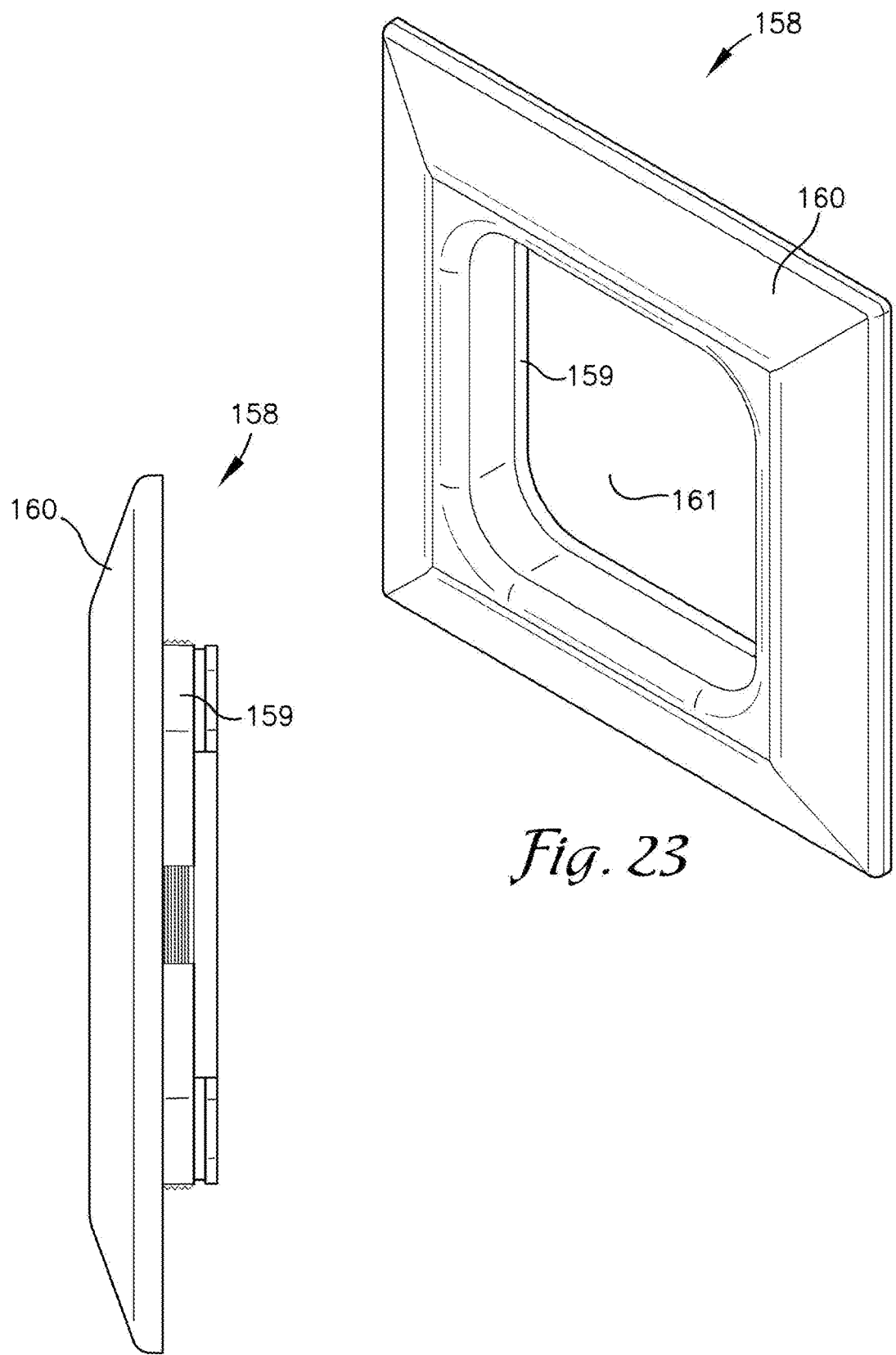

MODULAR SUPPORT SYSTEM FOR PLUMBING CONNECTIONS

CROSS-REFERENCE TO RELATED APPLICATIONS

The present application claims benefit of priority under 35 U.S.C. § 119 to U.S. Provisional Patent Application No. 62/527,885, entitled "MODULAR SUPPORT SYSTEM FOR PLUMBING CONNECTIONS" and filed Jun. 30, 2017, which is incorporated by reference in its entirety herein.

TECHNICAL FIELD

The present disclosure generally relates to fluid system support structures. More particularly, it is directed to a modular system for supporting water supply and drain lines for connection with fluid handling devices.

BACKGROUND

The plumbing system that delivers water and provides drainage in residential and commercial buildings includes hot and cold water supply lines and drain lines. These lines are generally installed in the spaces or stud bays between the vertical framing members, or support studs, within the building walls. The lines may also be installed in similar spaces, or joist bays, between the floor joists below the floors. Once the walls and subfloors have been installed, the supply and drain lines are both invisible and inaccessible, except at designated access points. These access points are positioned at locations where fixtures such as faucets, sinks, bathtubs, showers, toilets, washing machines, dishwashers, icemakers, and the like are to be connected to the supply and/or drain lines. At these locations, branches of the water supply and drain lines are typically brought together and connected to an open-front housing enclosure, or utility box, that is inset into a wall within the stud bay. Such housings provide the plumber with a convenient port to access the supply and drain lines and make up the connections with the fixture. They also provide protection for the connections. Following connection of the fixture, the open front of the housing can be closed with a removable cover or face plate to dress the opening. This allows future access in case it is necessary to shut off the water supply to the fixture for repair or replacement, or to clear the drain line.

Such utility housings include openings for entry of hot and/or cold water supply lines and a drain line. They are generally sized to provide sufficient space for up to three such lines as well as to accommodate shut-off or stop valves for the supply lines. Each housing is fastened in place within the wall space by attachment to the side of a stud. Alternatively, a housing may be connected to a pipe support bracket that is attached to and extends transversely between a pair of studs.

Previous utility boxes included supply and drain line openings in the top and bottom walls. Attachment structures were provided on the sides to enable connection of the side of the box to a stud or to a clip that could be attached to a stud or bracket. These boxes allowed entry of the supply lines only from above or below, although some allowed the supply lines to be located to the left or right of the drain line. Improved boxes were later developed to split the supply and drain lines between two boxes. This design enabled the supply and drain lines to be positioned in separate boxes, which could be mounted on opposite sides of a single stud. For example, U.S. Pat. No. 7,735,511 discloses a supply laundry box and a drain laundry box, the sidewalls of which are joined by a U-shaped clip that fits over a stud and extends down its sides, deep into the wall cavity to support the sides of the box.

Such connection clips extend far into the stud cavity and the requisite attachment structure on the housing necessitates correspondingly deep boxes. The box attachment structure also blocks the sidewalls from receiving water supply and drain lines, thereby restricting entry of these lines to the top and bottom walls of the box. In addition, the attachment structures on the sides of the box must be mounted in a vertical orientation in order to engage the connection structures on the legs of the clip. This feature prevents rotation of the boxes and makes plumbing installation more cumbersome. The configuration of such boxes also prevents connecting the boxes to each other in a stacked, vertical orientation, with supply and/or drain lines entering from the side.

It is with these observations in mind, among others, that various aspects of the present disclosure were conceived and developed.

SUMMARY

Implementations described and claimed herein address the foregoing problems by providing systems and methods for supporting water supply and drain lines for connection with fluid handling devices. In one implementation, a modular support system for plumbing connections includes a frame having a frame body with an inner surface and an outer surface. A plurality of flanges extend outwardly from the outer surface of the frame body. Each of the plurality of flanges has a forward surface. A plurality of rail assemblies are disposed about the outer surface of the frame body. Each of the plurality of rail assemblies include a first rail and a second rail. A connector is engageable to the frame independent of an orientation of the frame. The connector has an connector body. A slide assembly is disposed on the body of the connector, and the slide assembly includes a first boxway and a second boxway. A receipt of the first rail in the first boxway and the second rail in the second boxway forms a sliding joint between the frame and the connector. A tab is attached to the connector body at an attached end and extends to a free end such that the tab subtends an acute angle with the connector body in a projecting position. A contact by an adjacent flange of the plurality of flanges along a length of the tab during a forward movement of the connector body towards the frame body along the sliding joint displaces the tab in an inward direction towards the connector body. The tab automatically moves to the projecting position upon a cessation of the contact along the length of the tab during the forward movement. The free end of the tab contact the forward surface of the adjacent flange when the connector and the frame are in a locked position, and the locked position prevents rearward movement of the connector body away from the frame body.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIG. 2 is a perspective view of a frame unit for use alone or with an optional housing assembly to form a frame and housing unit.

FIG. 3 is a side elevation of the frame unit of FIG. 2.

FIG. 4 is a perspective view of an alternate frame unit for use without a housing assembly and including an optional, apertured face cover.

FIG. 11 is a perspective view of a connector unit configured for use with a conventional bracket.

FIG. 12 is a top plan view of the connector unit of FIG. 11.

FIG. 13 is a perspective view of a connector unit configured for use with a sliding bracket.

FIG. 14 is a perspective view of a connector unit configured to include an integral bracket member.

FIG. 17 is a perspective view of a frame extension unit.

FIG. 18 is a perspective view of a trap adapter gasket.

FIG. 23 is a perspective view of a frame-type cover for a frame unit.

FIG. 24 is a side elevation of the frame-type cover of FIG. 23.

FIG. 25 is a perspective view of a debris cover.

DETAILED DESCRIPTION

Figure 1:
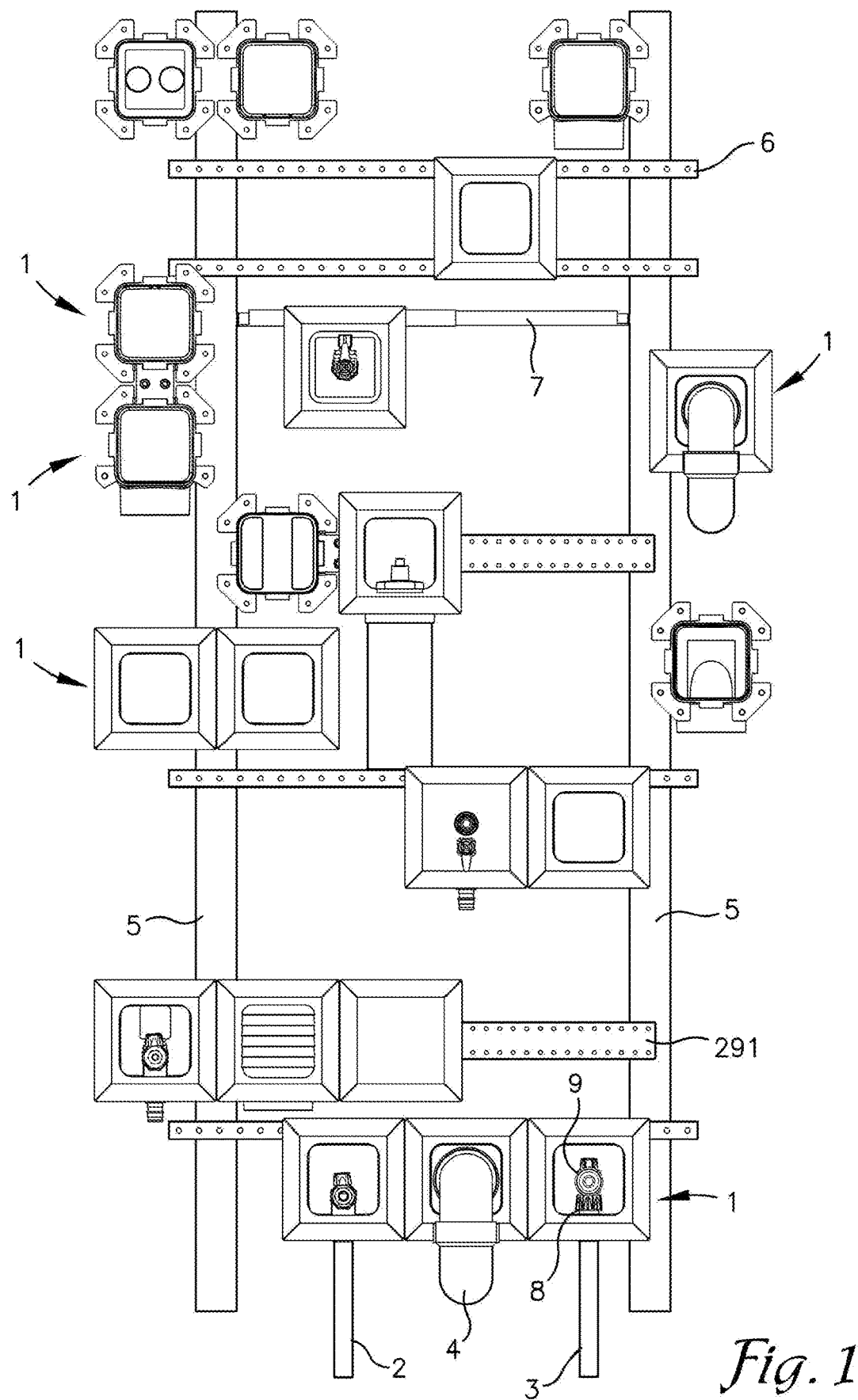
FIG. 1 is a perspective view showing a plurality of exemplary modular support systems with connectors attaching the frame units to each other or to a stud or to a horizontal bracket as single units, pairs and triple units in side-by-side relation, in vertical stacked orientation, and on either side of a stud.

The present disclosure provides a greatly improved modular support system for providing access to a plumbing line such as a water supply line or drain line for supplying water or drainage to a plumbing fixture. The system includes an open frame unit, a connector block, and an optional housing assembly for attachment to the frame unit. The connector block is configured to fit in front of a residential or commercial framing stud in the space normally occupied by wallboard, paneling, or other finished wall material. The frame unit is configured to fit substantially or entirely in front of a stud and to include connector engagement structure on all four sides. The optional housing assembly is configured to include frame connector engagement structure on all four walls, so that it can be rotated during installation for positioning of apertures to receive one or more supply lines from above, below, or from either or both sides. The connector may be mounted in front of a wall support member to connect a pair of units on either side of a stud. Two or more connectors may be used to connect two or more units in vertical relation to the side of a stud or to connect a first unit to the side of a stud and a second unit in transverse relation to the first unit. In one aspect, the connector may be used to connect two or more units below a support bracket connected between a pair of studs or to connect two or more units in side-by-side relation between upper and lower support brackets connected between a pair of studs.

The frame unit includes four shallow walls or sides connected in a generally rounded square configuration with an outstanding mounting flange at each corner. A rail assembly is connected to the outer surface of each side and includes a pair of generally parallel linear rails connected at their forward ends by a web positioned at the forward margin of the side. The generally L-shaped rails each include a leg connected to the wall and an outstanding flange transversely connected to the leg. The sides of the frame unit may include attachment structure for connection with a housing assembly. The frame may include a face cover plate, which may be apertured.

The connector block includes a front wall and first and second opposed sidewalls, at least one of which includes a linear slide assembly including first and second spaced boxways with a guide portion between. The boxways are configured to receive the L-shaped rails to cooperatively form a sliding joint between the frame and the connector. The boxways each include keeper plate structure that serves as a stop to constrain lateral movement of the rails out of the slide assembly. The connector block also includes third and fourth opposed sidewalls, each having an angularly projecting tab connected adjacent the front wall. The tab is configured to incline toward its respective sidewall during sliding forward travel of the connector boxways on the rails. The tab is also configured to return to its angularly projecting position after it slides past the corresponding housing corner flange. In its projecting position, the ends of the tab contact the forward surface of the flange to constrain rearward travel of the connector. The guide between the boxways contacts the rear surface of the rail web when the connector and housing are fully engaged, the rail web thereby constraining further forward travel of the connector on the rails.

The optional housing assembly includes four wall panels connected to form a circumscribing wall having four housing corners. The forward portion of each wall panel includes attachment structure for connection with a frame unit. At least one of the wall panels includes at least one supply or drain opening. The housing assembly may optionally include a rear wall. In another aspect, a frame unit and housing assembly may be of unitary construction to form a combination frame and housing unit.

In another aspect of the connector block configured for use with a bracket, the system may include a connector having first and second opposed sidewalls, the first sidewall having a pair of spaced boxways with a guide between, the boxways configured to receive a respective pair of rails on any one of the sidewalls of a housing unit. The second sidewall has a stepped configuration including a pair of slots for receiving one or more fasteners. The connector includes third and fourth sidewalls, each equipped with a tab configured to contact a corresponding housing flange and constrain rearward travel of the connector when the connector and housing units are engaged.

In another aspect, the connector includes an attached bracket member that extends transversely from one sidewall of the connector. The attached bracket may be used to connect multiple frame units in lateral spaced relation to each other with the first and last frame units attached to the front of a stud.

Generally, the presently disclosed technology provides a modular support system for plumbing connections includes a frame unit, a connector block that fits entirely in front of a support stud, and an optional housing. The frame includes four equilateral sides, each including a rail assembly. The connector includes a pair of opposed sidewalls, each having a pair of boxways that can receive the rails on any side of a frame unit to form a sliding joint between the frame and connector. A second pair of opposed sidewalls each include flexible tabs that engage frame corner flanges to prevent rearward disengagement of the connector from the frame. The housing includes structure for connection with the frame. The housing can be rotated for connection with the frame to receive vertical or horizontal plumbing lines. Connectors can connect the frame units in vertical or horizontal relation, or on either side of a building stud, or to brackets.

The presently disclosed technology thus generally provides a modular housing system that includes connectors that can be mounted entirely at the front of a conventional wall stud, that includes housing members that can be rotated to receive supply and/or drain lines from the top, bottom, left and/or right sides, and that can be interconnected either horizontally or vertically to one or more similar systems, to a support member, or to either side of a support member. The presently disclosed technology involves a connection of frame units in a variety of selectable orientations, locations, and/or positions. For example, a plumbing bracket may mount valves, fittings, or piping through outlets in the form of frame units that are cubed or otherwise symmetrical for iterative and modular application in various positions, such that plumbing lines can come from any of a top, a bottom, a first side, or a second side. In another example, the presently disclosed technology may be applicable to a lavatory system where an open frame unit is connectable in series with other frame units and configured to receive a soft flexible elastomer flange. The flange is removable from the frame unit and plumbing install where the flange may be installable with a frame escutcheon that keeps the flange attached to the frame unit via a friction connection with the escutcheon attached to an internal dimension of the frame unit. These and other advantages will be apparent from the present disclosure.

Referring now to the drawing figures, a modular support system 1 for plumbing connections is shown in FIG. 1 in association with hot and cold water supply lines 2 and 3, and drain lines and pipes 4. The system 1 is configured for positioning within a residential or commercial framed wall having vertical support members or studs 5 constructed of dimensional lumber or metal. Conventional flat support brackets 6 or channel-shaped sliding support or power brackets 7 may also be connected to the studs 5 in transverse relation for supporting the system 1 between studs. Stop valves 8, having handles 9 may be connected with the water supply lines 2 and 3.

As shown in FIGS. 2-4 and 6-8, the modular support system 1 includes a frame unit 11 and a connector unit or block 12 which may be used to connect the frame unit 11 to another frame unit in either vertical or side-by-side relation or to connect two frame units on either side of a stud. The frame unit 11 may be a frame, box, or similar structure. A plurality of connector blocks 12 may be used to interconnect more than two frame units in vertical and/or side-by-side relation, or with one or more frame units on either side of a stud. An optional apertured housing assembly 13 can be connected to the frame unit 11 and selectively oriented or rotated so that its apertures are positioned to receive previously installed vertical or horizontal supply lines and/or drain lines within the stud bay.

In more detail, the frame unit 11 includes a circumscribing wall 14 having an equilateral configuration defining an open forward perimeter margin or face 15 defining an opening 18. The wall 14 includes a forward wall portion or section 14a and a rearward wall portion or section 14b, each having a respective outer surface 16a or 16b and a respective inner surface 17a or 17b. The forward and rear wall sections 14a and 14b each include four corners 21, which delineate four wall sections or sides 22. The inner surfaces 17a and 17b of each wall section 22 includes a pawl 23 that is centrally located on the wall section adjacent the perimeter margin 15 of the frame 11. The pawls 23 are centrally located along the margin for universal engagement of corresponding ratchet strip structures on a system modules or elements to be described. The corners 21 may be rounded as shown in the drawings, or they may form right angles, or they may be chamfered to form an eight-sided polygon. Those skilled in the art will appreciate that the frame may be constructed to have any suitable overall configuration, provided four equidistant planar the wall sections 14a are provided having a size sufficient to accommodate a linear guide or rail assembly to be described. For example, the frame unit 11 could be generally octagonal, or it could be generally circular, with four equidistant facets tangent to the circular forward outer surface.

The outer diameter of the rear wall section 14b is sized to be slightly smaller than that of the forward wall 14a, so as to form a step or seat 19 to receive the optional housing assembly 13. Each rear wall section 14b includes engagement structure 25, such as a catch, or pawl that is centrally located for universal engagement of corresponding connection structure on a housing assembly 13.

The outer surface 16a of each forward wall section 14a of the frame includes a linear guide or rail assembly 26 that is configured for receiving a corresponding linear slide assembly 64 on a connector block 12 (FIGS. 6-8) to cooperatively form a sliding joint 65 (FIGS. 9, 10). between a frame unit 11 and a connector block 12. Each guide assembly 26 is positioned centrally adjacent the forward margin 15 of a respective side 22 of the forward wall 14a.

The guide assembly 26 includes a pair of first and second spaced apart linear rails 31 and 32 connected at their forward ends by a rail web or stop 33 that extends laterally outward from the face 15 of the frame. The rails project in raised fashion from the wall sections 22 and extend rearwardly from the web 33. The length of the rails is sized for reception of corresponding parts of the connector block 12. The legs each have a generally L-shaped configuration, including an outstanding first rail leg portion 34 and second rail leg portion 35 and a transverse first rail leg flange portion 36 and second rail leg flange portion 37 (FIGS. 2-4) that extend parallel to the forward wall outer surface 16*a*. The rails 31 and 32 are positioned on the forward wall 14*a* so that each pair of legs 34 and 35 extends rearwardly slightly inboard from the lateral edges of a respective rail flange and in parallel relation with each other. The first and second rail flanges 36 and 37 extend laterally from the sides of the respective legs 34 and 35, with the forward end of each flange aligned with an outstanding corner of the web 33. In this manner, the L-shaped profile of the legs 34 and 35 supports the web 33 along its width as well as along a portion of the length of its outer margin. The parallel legs of the rails form a channel 41 sized to receive a corresponding guide structure on the connector block 12.

The frame unit 11 is equipped at each corner of the forward frame section 14*a* with an outstanding flange 42 that extends outwardly from the corner 21 and a preselected portion of each of the adjacent wall sections 22. The flanges 42 are positioned a sufficient distance rearward of the frame face 15 to serve as travel stops for structures on a connector block 12 when the frame and one or more blocks are connected. The flanges 42 each include a pair of spaced apertures 43, with each aperture positioned in spaced relation to a respective wall section 14*a*.

As shown in FIG. 4, a cover piece or face plate 44 may be inset on the forward section 14*a* of the frame, in spaced relation to the front margin 15. The cover plate 44 includes one or more apertures 45 that are sized for reception of a hot and/or cold water supply line 2, 3, which may be connected to a stop valve 8 at the front of the plate as shown in FIG. 1.

Figures 7, 8:
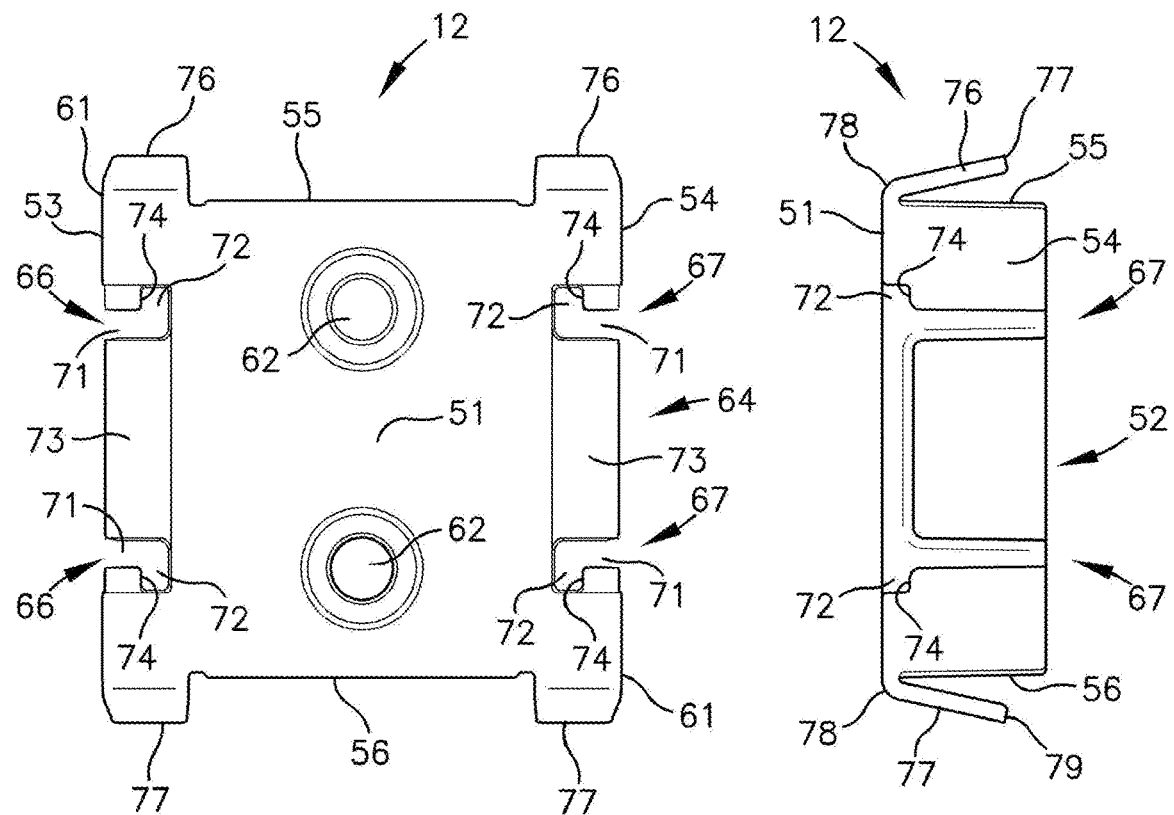
FIG. 7 is an enlarged top plan view of the connector unit of FIG. 6.
FIG. 8 is a side elevational view of the connector unit of FIG. 6 with parts broken away to show the rail assembly channels.
Figure 6:
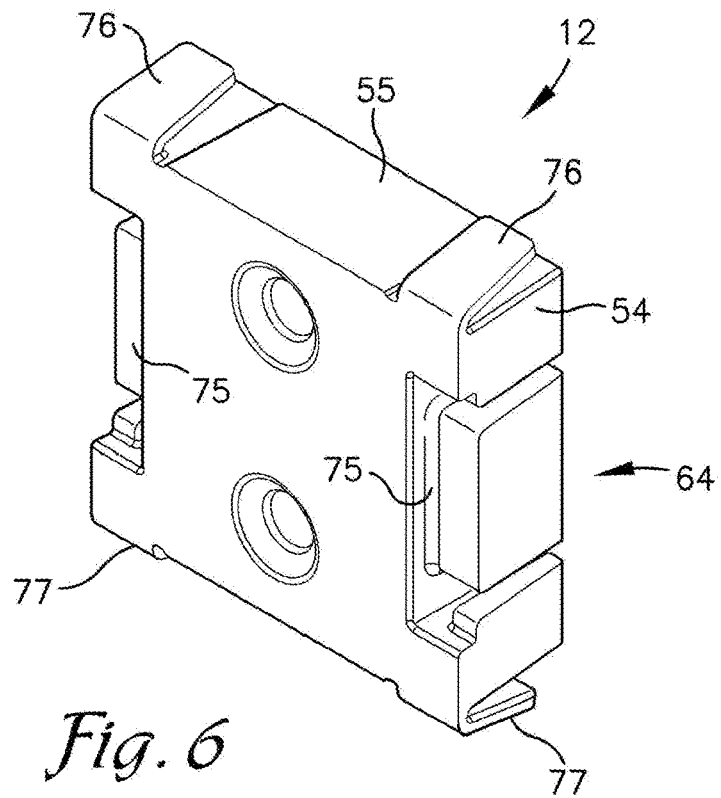
FIG. 6 is a perspective view of a connector unit in accordance with the modular support system.

As shown in FIGS. 6-8, the connector block 12 has a generally square-shaped overall configuration including a front wall 51, a generally open back 52, which may include support ribs, first and second opposed sidewalls 53 and 54 and third and fourth opposed sidewalls 55 and 56. The sidewalls are connected at four respective corners 61. In one aspect, the connector block may also include a back wall. The block may also be of generally hollow or solid construction. The overall width of the blocks is sized to permit mounting on the front-facing surface of a standard wall support member or stud 5, while engaging the guide rail assemblies 26 of adjacent frame units 11 positioned on either side of the stud. The overall depth of the blocks is sized to permit the block 12 to be coplanar with or slightly inset from the finished surface of a wall when the block is mounted on a support stud. Thus, for use with standard "2×4" dimensional lumber or conventional cold-formed sheet steel metal studs mounted with the nominal "2 inch" face or flange facing forward, the connector block 12 would be constructed to have a width between the first and second sidewalls 53 and 54 of from about 1.5 inches to about 1.625 inches. The width between the third and fourth sidewalls 55 and 56 may be slightly reduced to accommodate tab structures to be described. To achieve a coplanar or slightly inset mounting with respect to the finished wall, the block would be constructed to have a depth of from about 0.25 inch to about 0.75 inch, preferably about from about 0.5 inch to about 0.625 inches, still more preferably about 0.475 inches. Those skilled in the art will appreciate that connector blocks may be manufactured in a variety of preselected sizes for use with variously sized wall supports and wall finishes. The front wall 51 of the block may be constructed to include a pair of spaced apertures 62 for receiving fasteners to secure the block 12 to the forward face of a stud 5. These apertures extend through support members or sleeves (not shown) on the connector back side 52. In one aspect, the front wall 51 is constructed without apertures.

The connector block first and second sidewalls 53 and 54 each include a linear slide assembly 64 that is configured for engagement with any one of the linear rail assemblies 26 of a frame unit 11 to cooperatively form a sliding joint 65. The linear slide assembly 64 includes pair of first and second sockets, or box guideways 66 and 67 located on respective first and second sidewalls 53 and 54. Each of the boxways 66 and 67 has a generally L-shaped configuration, including a rail leg receiving portion 71 communicating with a rail flange receiving portion 72. The boxways 66 and 67 are positioned in spaced apart, mirrored relation, with the rail leg receiving portions 71 opening outwardly in parallel relation on either side of a center guide 73 and the rail flange receiving portions 72 extending transversely toward the respective third and fourth sidewalls 55 and 56.

The first and second boxways 66 and 67, specifically the portions of the connector front wall 51 that extend between the rail flange-receiving portions 72 of the boxways 66 and 67 and the first and second sidewalls 53 and 54, include respective keeper plate structures 74. The keeper plate structures 74 each serve as a stop for a corresponding rail 31 or 32 and constrain against movement of the rails along a vertical Z-axis (FIGS. 9 and 10) and consequent disengagement from the connector block 12 when the block is engaged with a frame unit 11. The portion of the connector front wall 51 that extends between the boxways 66 and 67 forms the center guide 73, which includes an indention 75 (FIG. 6) that is sized to accommodate the rail web 33 to provide a coplanar relation between the center guide and the rail web when the connector is engaged with a frame unit 11.

First and second tab structures 76 and 77 are connected with the respective third and fourth connector sidewalls 55 and 56. Each tab includes a first end 78 and a second end 79. Each tab subtends an acute angle with respective sidewall 55 or 56, preferably an angle of from about 5° to about 15°, and more preferably an angle of about 10°, although other suitable acute angles may also be employed. The tabs 76 and 77 are constructed of a flexible material, such as a synthetic resin, that enables the tab second ends 79 to be urged against their respective sidewalls during connection of the connector block unit 12 with a frame unit 11. Once the two units are connected, the tabs spring back to a resting position in which the tabs subtend an acute angle with their respective sidewalls. The length and width of the tabs 76 and 77 are sized to permit the second end 79 of each tab to engage the forward-facing surface of a corner flange 42 of a frame 11 unit. In this manner, the corner flanges 42 serve as stops for the second tab ends 79 to constrain rearward movement of the connector block 12 on the linear rail assembly 26 and consequent disengagement of the connector block 12 from the frame unit 11.

Figure 5:
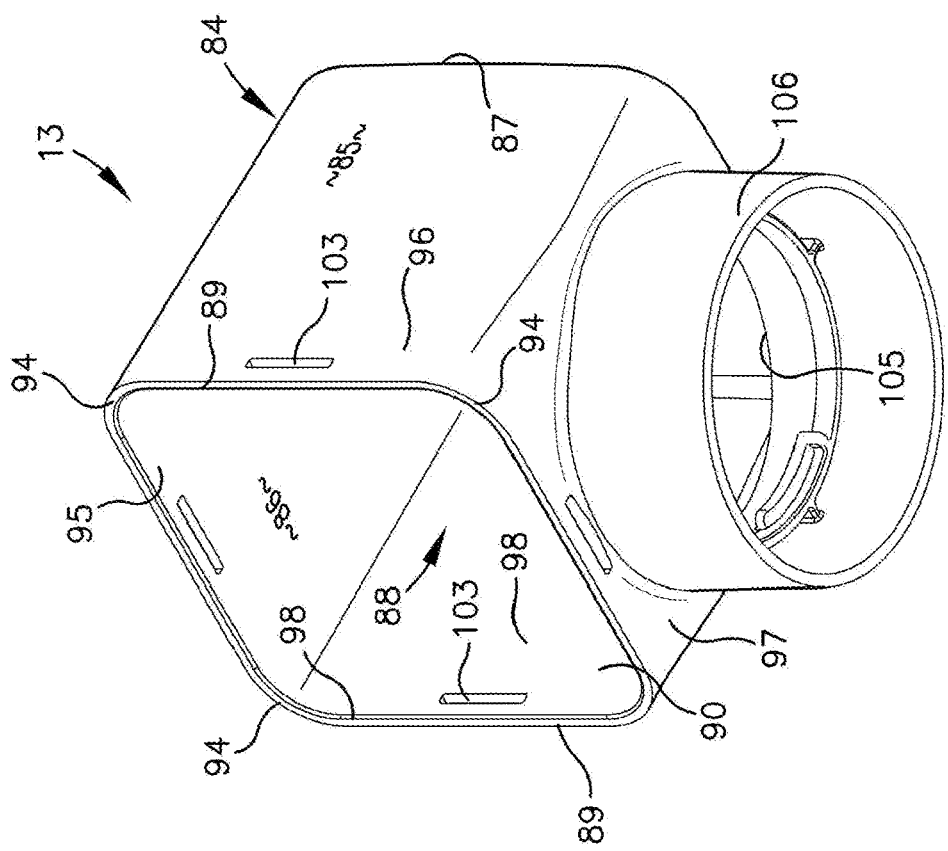
FIG. 5 is a perspective view of a housing assembly for use with the frame unit of FIG. 2.

An optional housing assembly 13 is shown in FIG. 5 and includes an equilateral circumscribing wall 84 presenting an outer surface 85 and an inner surface 86. An optional rear wall 87 may be planar, or it may be slightly bowed outwardly or convex. The wall 84 and optional rear wall 87 cooperatively define an enclosure or receptacle 88 presenting a forward perimeter margin or face 89 defining an opening 90. The wall 84 includes four corners 94 which delineate four wall panels or sections 95, 96, 97 and 98 having equal width dimensions. The corners 94 may be rounded as shown, or they may form right angles, or they may be chamfered to form an octagon. The housing assembly 13 may be formed of a synthetic resin, fiberglass-reinforced synthetic resin, metal, or any other suitable material. The assembly is preferably of unitary construction, although in another aspect, the wall panels 95, 96, 97 and 98 and rear wall 87 (if present), are formed as discrete units interconnected to form the corners. Any or all of the four wall panels or the rear wall may be constructed to include one or a plurality of apertures sized to receive water and/or drain lines, valve fittings, or any combination thereof.

Each of the wall panels 95, 96, 97, and 98 includes engagement structure 103, such as an aperture, catch or pawl that is centrally located on the panel adjacent the housing face 89, and is sized, shaped, and positioned for registry with corresponding engagement structure such as pawls 23 on a frame unit 11.

Figure 16:
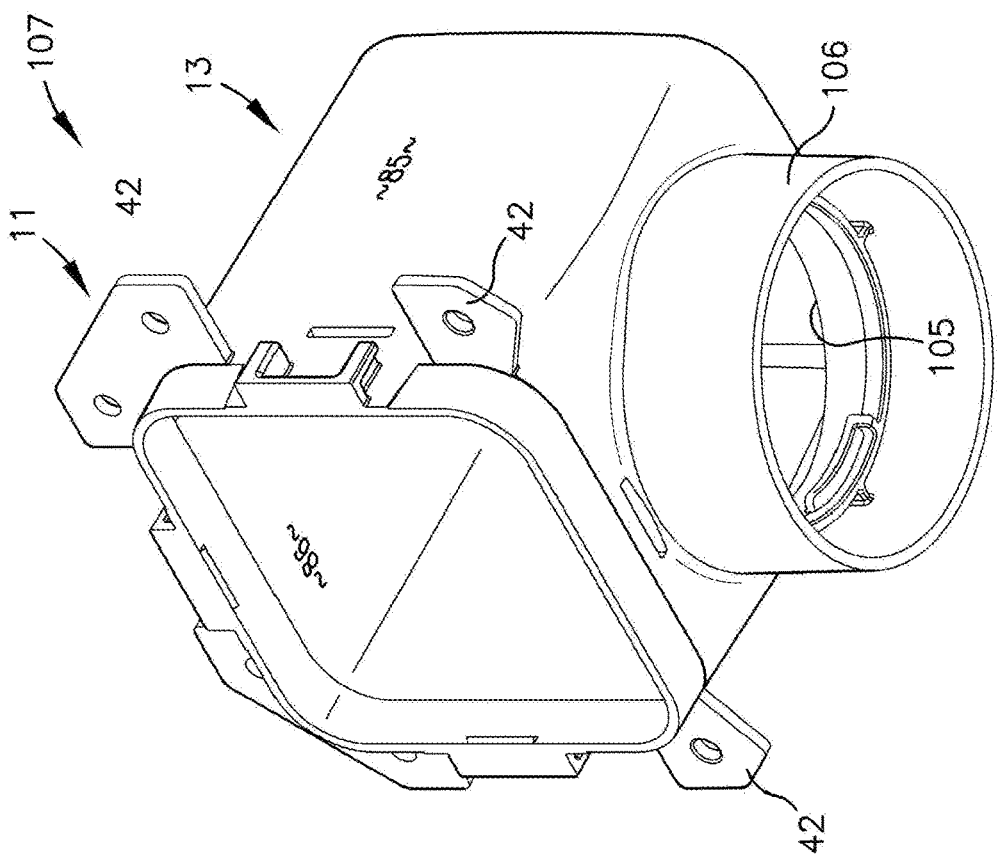
FIG. 16 is a perspective view of an alternate combination unit including a drain aperture with drain collar on one wall panel of the housing assembly.
Figure 15:
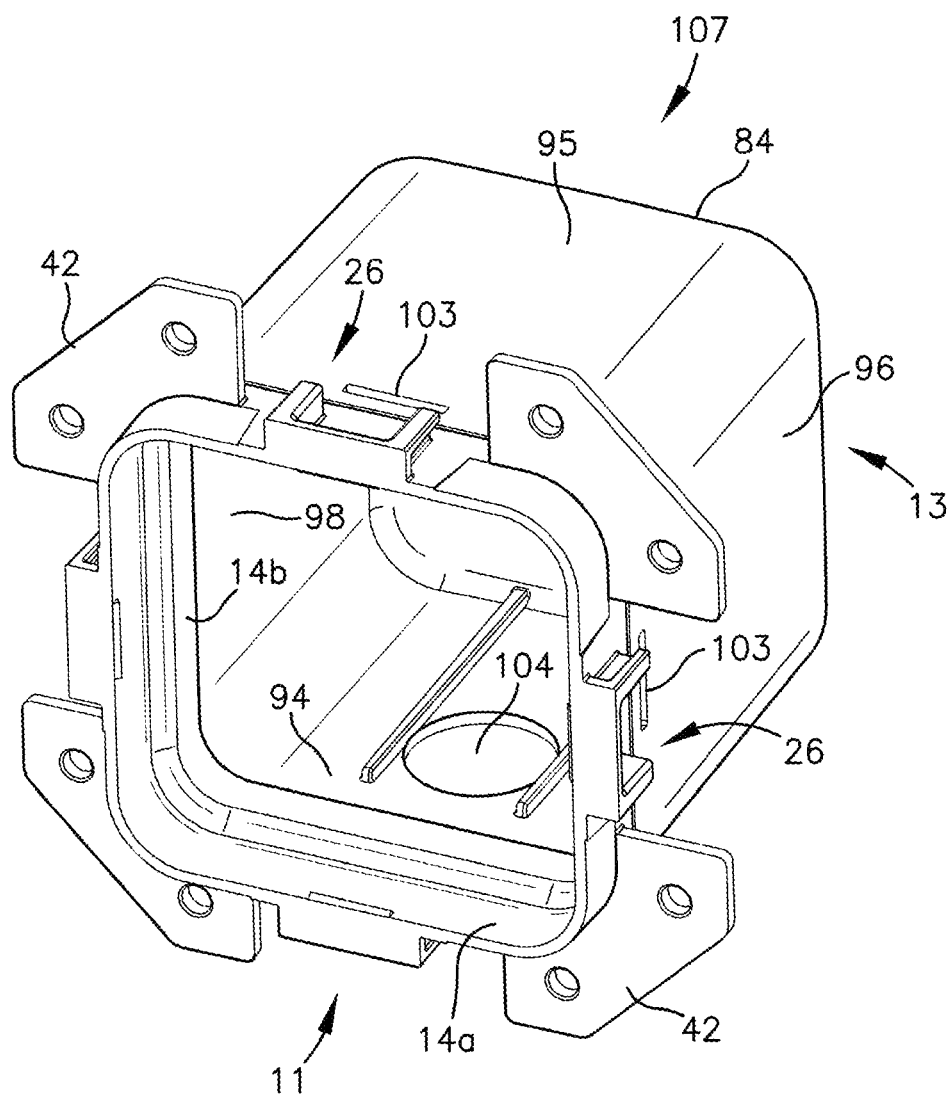
FIG. 15 is a perspective view of a combination unit including a supply line aperture on one wall panel of the housing assembly.

One or more of the wall panels 95, 96, 97, and 98 includes at least one aperture 104 that is sized to receive a supply line 2 or 3 (FIG. 15) or a pair of supply lines. One or more of the wall panels may alternately, or also, include an aperture 105 that is sized to receive a drain line or pipe 106 (FIGS. 5 and 16). The aperture 105 may also be equipped with a drain collar 106. Because each wall panel is constructed to include an identical frame connection aperture 103, none of the wall panels are predesignated as a "top" "bottom" or side wall. Thus, the wall panels may be constructed to include any arrangement of one or more supply and/or drain apertures, which may be covered by knockout seals or plugs that can be selectively removed to accommodate the desired type and number of lines. Advantageously, the housing assembly 13 may be rotated prior to installation to position the apertures to receive hot and cold supply lines 2 and 3 from above, below, laterally from one or both sides, or any combination thereof.

The housing assembly 13 may be constructed to include either one or two supply line apertures 104 in any one or any combination of wall panels 95, 96, 97 and/or 98, to enable both hot and cold supply lines 2 and 3 to enter the enclosure 88 through opposed wall panels 95 and 97 or 96 and 98 or to enter the enclosure orthogonally, through adjacent wall panels 95 and 96, or 96 and 97 or 97 and 98 or 98 and 95. Similarly, a housing unit may be constructed to include a drain aperture 105 through any one of the wall panels 95, 96, 97 or 98, either alone in combination with a hot and/or cold supply line.

In one aspect, the frame unit 11 may be constructed to include truncated or clipped frame unit flanges 42 on one side. As shown in FIG. 16, the frame unit and housing unit 13 may be connected with the clipped flanges 42 and drain line aperture 105 positioned for installation adjacent a drain line 4 to allow greater gripping access to the drain collar 106 when for making up the connection between the drain collar 106 and a drain line 4.

In this manner, a housing assembly 13 may be constructed, to include hot and cold supply line apertures positioned on respective opposed wall panels 95 and 97 or 96 and 98 and a drain line aperture on a respective adjacent wall or its opposed wall panel 96 or 98 or 95 or 97. Alternatively, the hot supply line aperture may be positioned on any wall, the cold supply line aperture may be positioned on any other wall panel, and the drain line aperture may be positioned on any other wall panel. Alternatively, both hot and cold supply line apertures may be positioned on the same wall panel 95, 96, 97, or 98 and a drain line aperture on any other wall panel. Alternatively, one or both hot and cold supply line apertures and a drain line aperture may be positioned on the same wall pane 195, 96, 97 or 98. Still further alternatively, the supply line apertures may be positioned alone or together on any of the housing assembly wall panels of a first combination frame unit and housing assembly and the drain line may be positioned on any of the housing assembly wall panels of a second combination frame unit and housing assembly 13.

FIGS. 11 and 12 illustrate alternate embodiments of a connector block 200 for use in connecting a frame unit above or below a conventional bracket 6. FIG. 13 illustrates an alternate embodiment of a connector block 201 for use in connecting a frame unit above or below a sliding bracket 7. FIG. 14 illustrates an embodiment 202 of a connector block for use in connecting a frame unit with the end of a bracket.

Figure 9:
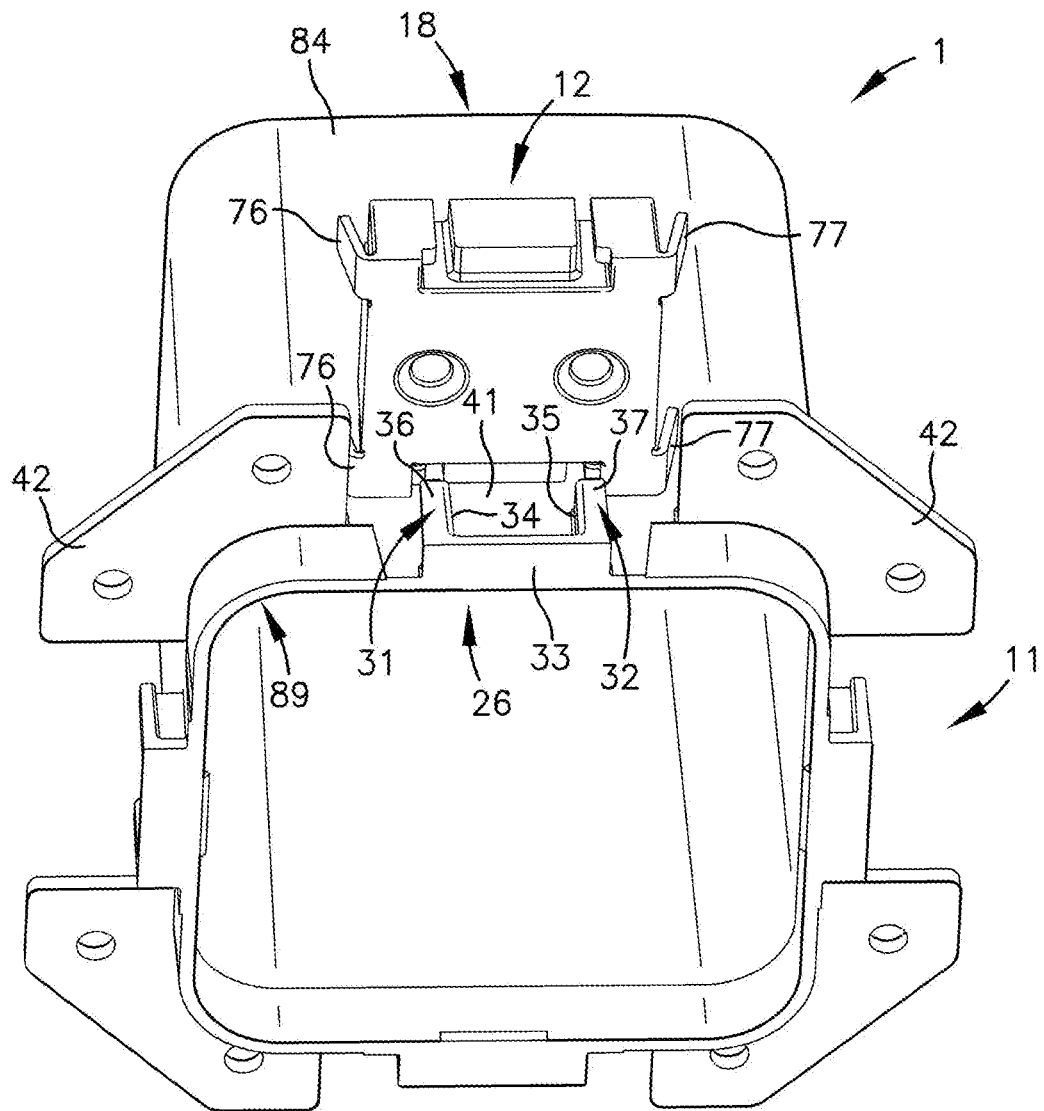
FIG. 9 is a perspective view of an embodiment of the modular support system with a connector block positioned for engagement of the slide assembly with the frame rail assembly.
Figure 10:
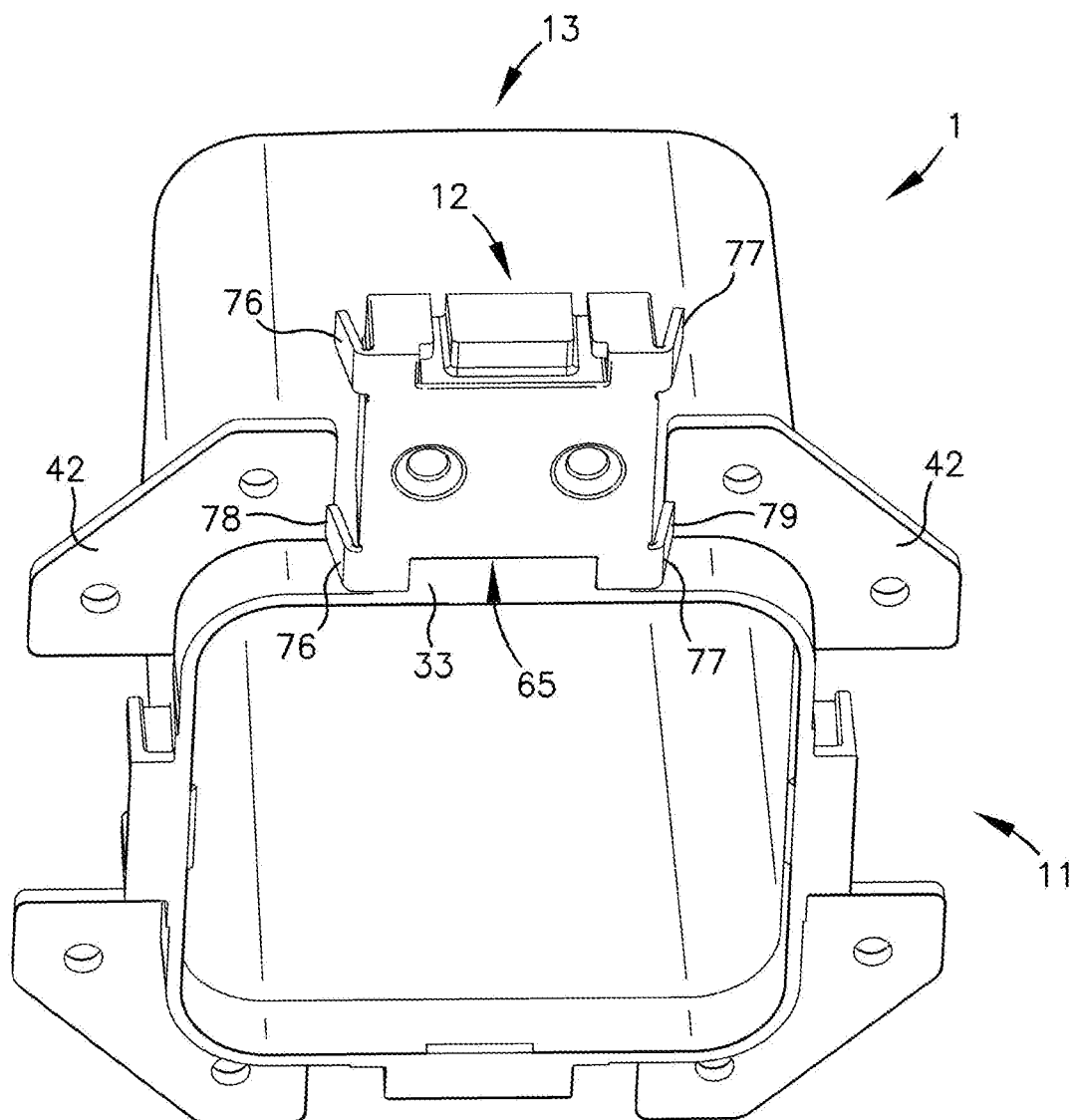
FIG. 10 is a perspective view similar to FIG. 9 with the connector and frame fully engaged and the connector guide engaging the frame rail web and the tabs engaging the frame flanges.

The connector blocks 200 and 201 of the embodiments shown in FIGS. 11-13 include some structures similar to those of the connector block 11, which are identified with corresponding numbers in the 200 series. The connectors each include a front wall 251, a back 252, and first and second sidewalls 253 and 254. The first sidewall 253 includes a linear slide assembly 264 including boxways 266. The third and fourth sidewalls 255 and 256 include corresponding first and second tabs 276 and 277 configured to cooperate with any of the linear rail assemblies of a frame unit to form a sliding joint 65 (FIGS. 9-10).

Unlike the connector block embodiment 11 previously described, the second sidewall 254 of connector blocks 200 and 201 does not include a linear slide assembly. The front wall 251 lacks apertures for receiving fasteners, and terminates a short distance behind the linear slide assembly 264 components for orthogonal connection to the second sidewall 254. A generally L-shaped flange 280 is connected in outstanding orthogonal relation to the base of the second sidewall 254. The flange 280 includes a first leg 281 that is generally parallel to the front wall 251 and a second leg 282 that is generally parallel with the second sidewall 254. The first leg 281 includes a pair of spaced apart apertures 283 for receiving fasteners for fastening the connector 200 or 201 to a bracket 6 or 7 as shown in FIG. 1.

As shown in FIG. 11 the second leg 282 of flange 280 is sized to have a shallow depth to accommodate a depth of a generally planar conventional bracket 6. A return or pair of returns 284 extends from the end of the second leg 282 in generally parallel relation to the first leg 281 of the flange 180. In combination with the first and second legs 281 and 282, the return 284 forms a generally U-shaped hook structure 285 for receiving the top edge of a bracket 6 or 7 and holding the connector 200 or 201 in place on the bracket. A shown in FIG. 13, the second leg 282 may be sized to have a depth sufficient to accommodate the three dimensional configuration of a generally U-shaped sliding bracket 7.

The hook structure 285 enables sliding engagement of the connector 200 or 201 along the top edge of a bracket to a desired position where it can be fastened in place, and it also serves to constrain the connector against forward movement away from the bracket. The aspects of this connector blocks 200 and 201 enable one or more housing units to be connected from above or below with one or more brackets 6 and/or 7 for positioning of the frame units 11 at selectively spaced intervals within a wall.

In another aspect shown in FIG. 14, a combination connector-bracket member 202 is configured substantially as described, except that the generally L-shaped flange 280 is replaced by an integral bracket member 291 connected in outstanding orthogonal relation to the base of the second sidewall 254. The bracket member 291 has a generally planar overall configuration and includes spaced apart apertures 292 for receiving fasteners for connection of the bracket portion 291 to a support member 5. The bracket member 291 may be trimmed to a desired length, thereby enabling connection of one or more frame units in selectively spaced apart horizontal relation to a support member 5 and/or to each other within a stud bay.

The modular support system 1 also includes structures or modules designed for connection with the frame unit by engagement with the pawls 23 on the inner surface of the forward wall sections 14a.

FIG. 17 illustrates a frame extension unit 110 having a circumscribing wall 111 defining an opening 112 and including an outer surface 113, an inner surface 114 and wall sections 115 that are sized and shaped for reception through the frame opening 18. The outer surface 113 of each wall section 115 includes ratchet strips 116 positioned adjacent the rear margin thereof for engagement with the frame pawls 23. When the extension unit 110 and the frame 11 are engaged, the extension unit wall 111 extends beyond the frame margin 15 and folds over to form an expanded lip or collar 117. The rear margin of the collar 117 rests against the linear rail webs 33 at the forward margin 15 of the frame unit 11 when the extension unit 110 and frame unit 11 are engaged. In this manner, the collar 117 serves as a stop against further rearward movement of the extension unit 110 into the frame 11. The inner surface 114 of each wall section 115 includes a catch or pawl 118 that is positioned centrally adjacent the fold margin for universal engagement of corresponding ratchet strip structure with other elements of the system.

Stub waste lines are installed during rough plumbing and are often imperfectly aligned for connection with the outlet of a P-trap drain fitting for a lavatory or sink. Damage to the stub may occur during finish installation within the confines of a stud bay. FIG. 18 illustrates a trap adapter gasket 122 configured for engagement with the extension unit 110. The gasket 122 is constructed of a flexible, elastomeric material such as rubber, silicon, or a synthetic resin to provide a snug, adjustable connection between a drain stub and a P-trap outlet. The gasket 122 includes a tubular sleeve 123 having a rear opening 124 that is sized for snug reception of a P-trap outlet. At its forward end, the sleeve 123 is orthogonally connected to a front wall member 125 that extends outwardly from a front opening 126 of the sleeve. The front wall 125 has an overall shape corresponding to that of the frame extension unit 110. At its outer perimeter, the front wall 125 is orthogonally connected to a circumscribing sidewall 127 that defines a forward opening 128 The sidewall 127 extends forwardly and folds over to form an expanded lip or collar 129 having a generally U-shaped, rearward facing open channel or groove 130. The channel is sized for reception of the collar 117 of a frame extension unit 110 in covering relation In use, (FIG. 1) the flexibility of the gasket unit 122 allows the channel 130 to be easily aligned with and slipped over the frame extension collar 117. The gasket collar 129 snugs the gasket 122 against the collar 117 of the frame extension unit 110. The flexibility of the gasket 122, particularly the sleeve 123 and front wall 125 cooperate to allow easy installation of the gasket over the drain stub and manipulation of the P-trap to connect to the stub. The flexibility of the gasket 122 also serves to bridge any misalignment between the P-trap outlet and the position of frame opening 18. The frame can be fitted with a frame cover, or, if the installation is positioned within a cabinet and not visible, the cover can be omitted and the gasket collar 129 and front wall 125 used as an escutcheon to trim the gap between the wall surface and the frame unit 11. The gasket unit 122 is removable and replaceable.

Figure 19:
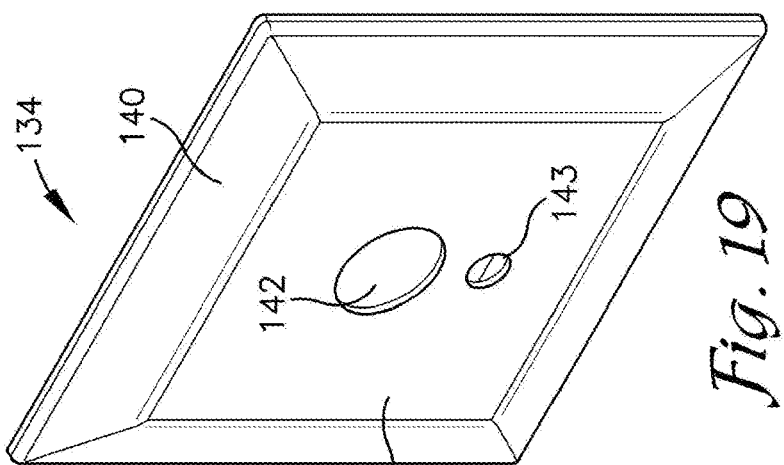
FIG. 19 is a perspective view of a stop valve cover.
Figure 21:
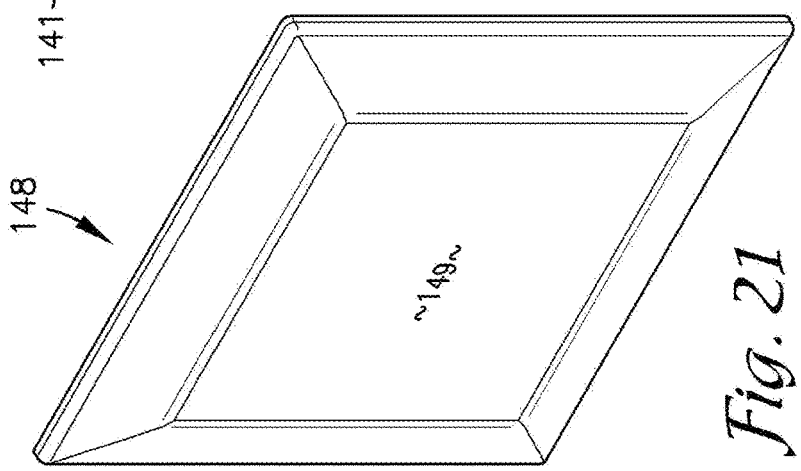
FIG. 21 is a perspective view of a debris cover.
Figure 20:
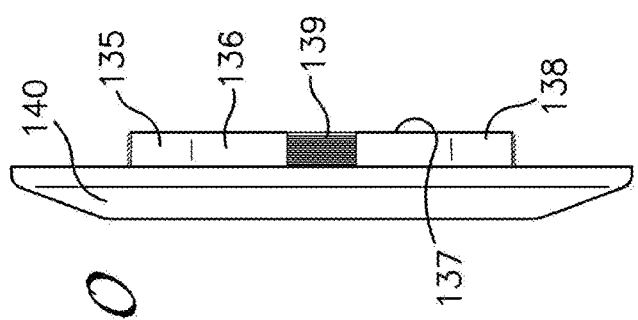
FIG. 20 is a side elevation of a cover unit.

FIGS. 19 and 20 illustrate a stop valve receiving cover 134 for the opening 18 of a frame unit 11 that allows a stop valve 8 and handle 9 to be mounted outside the frame unit for easy access, while closing off the frame unit opening 18. The cover 134 includes a circumscribing sidewall 135 having an outer surface 136, an inner surface 137 and wall sections 138 that are sized and shaped for reception through the frame perimeter margin 15. The outer surface 136 of each wall section 138 includes ratchet strips 139 positioned adjacent the rear margin thereof for engagement with the pawls 23 of a frame unit 11. A moulding 140 extends outwardly from the forward margin of the sidewall 135 to cover any space remaining between the finished wall and the frame unit 11. A cover or face plate 141 is connected to the forward margin of the sidewall 135 over the frame opening 18. The cover plate 141 includes a first aperture 142 that is sized for reception of a supply line 2 or 3 for connection to a stop valve 8 on the exterior of the face plate 141 (FIG. 1). A second, smaller second aperture 143 is positioned in spaced relation to the central aperture 142 and is sized to accommodate the stem of a handle 9 for stopping the flow of water to the valve 8. The apertures 142 and 143 are particularly well suited to accept valve fittings for mounting a valve outside the cover plate 141, such as the fittings described in U.S. patent application Ser. No. 14/529,264 for Plumbing Fitting Assemblies FIG. 21 illustrates an access cover unit 148 for covering the opening to an unused housing a finished wall. The access cover 148 is identical to the stop valve cover 134 previously described and illustrated in FIGS. 19 and 20 except that it includes an intact cover plate 149 that is of generally planar construction, without any apertures or openings. This enables the access cover unit 148 to completely cover the frame unit opening 18 as well as any gaps between the frame unit 11 and the finished wall.

Figure 22:
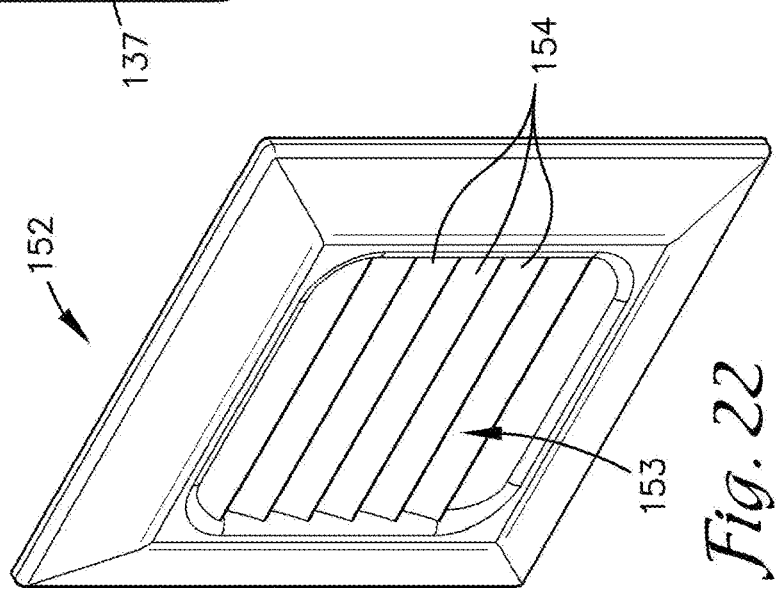
FIG. 22 is a perspective view of a louvered cover.

FIG. 22 illustrates a vented cover unit 152. The vented cover 152 is identical to the cover units 134 and 148 previously described, except that the cover plate 153 is constructed to include a series of louvers 154, which provide ventilation while dressing the frame unit opening 18 and covering any gaps between the frame unit 11 and the finished wall.

FIGS. 23 and 24 illustrate an escutcheon-type cover unit 158. The unit 158 is similar to the cover units 134, 148 and 158 previously described, except that the cover plate is absent. The circumscribing sidewall 159 is connected to a moulding 160 that extends outwardly to cover any gaps between the frame unit 1 land the finished wall, and the unobscured sidewall 159 defines an opening 161 through which any plumbing stub outs in the wall cavity can be viewed.

FIG. 25 illustrates a debris cover unit 164 for protecting the frame opening 18 against debris, for example, during finishing of the surrounding wall surface. The debris cover unit 164 includes a circumscribing sidewall 165 having an outer surface 166, an inner surface 167, and wall sections 168 that are sized and shaped for reception though a frame unit opening 18. The outer surface 166 of each wall section 168 includes ratchet strips 169 positioned adjacent the rear margin thereof for engagement with the pawls 23 of a frame unit 11. When the debris cover unit 158 and the frame 11 are engaged, the debris unit sidewall 165 extends slightly beyond the frame unit margin 15 and folds over to form a rolled edge or collar 170. The cover unit 164 has the overall general configuration of a divided tray, including a flat center panel 172 extending from opposed portions of the sidewall 165 adjacent the forward collar 170 and defining a pair of recessed areas 173 on either side. The recesses each include a rear wall 174. The center panel 172 and the rear walls 174 cooperatively serve to close off the rear margin of the unit sidewall in much the same manner as a cover plate, while facilitating gripping of the cover unit 164 during insertion and removal.

In use, a worker selects components of the modular support system 1 for positioning as desired, either in vertical relation on one or both sides of a wall support member 5, in horizontal relation on one or both sides of a stud, in multiples in side-by-side relation between two studs, or in multiple spaced relation between two studs.

A user may install a pair of frame units 11 with linear rail assemblies 26 in vertical relation by first determining the location of the supply line or lines 2 and 3 or the drain line 4 to be connected with the frame unit 11. The user selects a connector unit 11 with a pair of linear slide assemblies 64 and orients the connector unit so that the slide assemblies 64 are vertically oriented for engagement of the lowermost slide assembly 64 with a linear rail assembly 26 on any forward wall section 14*a* of a frame unit. The user next positions the front of the connector behind the back of the frame unit so that the connector boxways 66 and 67 are aligned with the rearward extending linear rail assembly 26 as shown in FIG. 9. The user next urges the connector toward the frame unit until the rails 31 and 32 are received within the boxways 66 and 67 to form a sliding joint 65 and the tabs 76 and 77 begin to compress against the edges of the flanges 42 as shown in FIG. 9. The user continues to urge the connector forward along the sliding joint until the connector center guide 73 contacts the rear surface of the rail web 33 and the ends of the tabs clear the flanges 42, at which point the compressed tabs spring back to their original positions away from the third and fourth sidewalls 55 and 56 of the connector 12 and the user may hear an audible click (FIG. 10). Advantageously, the user may install the frame unit 11 at a location where a fixture is to be connected without regard to whether the supply and/or drain lines 2, 3 are horizontal or vertical or whether both lines originate from the same direction, opposite directions, or orthogonally, since lines from all directions within the stud bay will be behind the frame unit 11.

In the example shown in FIGS. 9 and 10, once a respective frame unit 11 and a connector block 12 are fully engaged, the legs 34 and 35 and flanges 36 and 37 of the rails 31 and 32 are constrained by the keeper plate structure 74 against sideways movement along the lateral Y-axis, which might disrupt the tabs 76 and 77 from their stops 33 and cause movement away from the housing along the vertical Z-axis to separate the frame unit from the connector. The rail web 33 serves as a stop, constraining the center guide 73 against forward movement of the connector along the X-axis, which extends from front-to-rear of the frame unit 11. The frame unit flanges 42 serve as stops constraining the second ends 78 and 79 of the tabs against rearward movement of the connector unit along the X-axis. The frame unit and housing assembly are thus securely locked together without the use of fasteners and are constrained against disengagement along either the X, Y or Z axis.

A user may also connect a housing assembly 13 to a frame unit 11 to form a combination unit 107 by aligning the forward perimeter margin 89 of the housing with the rear section 14*b* of the frame. The then user urges the frame unit 11 and housing assembly 13 toward each other until the housing assembly sidewall 84 slides over the frame wall rear section 14*b* in telescoping relation. Continued urging together of the frame and housing causes the frame connection apertures 103 of the housing to slide over the pawls 25 in the frame rear section 14*b* and brings the housing assembly margin 89 into contact with the seat 19. In this manner, the frame unit and housing assembly are engaged, with the pawls 25 and apertures 103 cooperating to constrain rearward movement of the housing 13, and the seat 19 constraining forward travel of the housing past the pawls. The frame and housing may be disengaged at any time by use of a tool, such as a screwdriver to release the pawls 25 from the apertures 103.

The user may install the combination unit 107 by rotating it until housing supply line aperture(s) 104 and/or a drain line aperture 105 are presented on one or more sides of the housing assembly corresponding to the direction of the plumbing lines. As an example, if two units are to be mounted in vertical relation with hot and cold supply lines entering the upper unit from the left, and a drain line connected from below the lower unit, the user will select a housing assembly 13 with a pair of supply line apertures 104 for use with a frame unit 11 to make up the upper combination unit 107 and a frame assembly 13 with a drain line aperture 105 with a frame unit 11 for use to make up the lower combination unit 107.

The user rotates the first combination unit 107 equipped with supply line apertures until the housing assembly portion 13 is positioned with a pair of supply line apertures 104 on the left for use as an upper unit. The user rotates a second combination unit having a housing assembly with a drain line aperture 105 until it is positioned as shown in FIG. 5, on the lower side of the unit. The method of engagement of the two combination units 107 with a connector block 11 having a pair of linear slide assemblies is the same as previously described. The units may then be positioned with corresponding pairs of frame flanges in overlapping relation on the stud and fasteners may be inserted to fasten the flanges onto the stud.

While connection of the frame units 11 or combination frame and housing units 107 prior to attachment of the units to the stud has been described, it is foreseen that the frame units or combination units may be attached to the connector blocks 12 and to each other and to the studs in any order selected by the user. For example, the upper frame unit or combination unit and connector may be joined before connection of a lower frame unit or combination unit. Alternatively, one frame unit or combination unit may be connected to the stud, then joined to a connector and the other frame unit or combination unit may be joined to the connector and then fastened to the stud. It is also foreseen that three or frame units or combination units or any combination thereof may be joined in vertical relation to a stud. A user may also install two frame units, two combination units, or a frame unit and one combination unit in vertical relation by selecting an alternate connector for a bracket or power bracket as shown in FIGS. 11-12 and 13 for attachment of a first unit to a bracket 6 or power bracket 7 as described and attaching the second unit using a connector unit 12. The bottom end of the second unit may be connected to a second bracket or power bracket using an alternate connector as described above. It is also foreseen that a combination frame and housing unit may be of unitary construction, obviating the need for connection.

A user may also install two units, including frame units and/or combination units in horizontal relation by selecting a pair of units, rotating any selected combination units until the supply and/or drain apertures are oriented to correspond with the positions of the supply and/or drain lines, and interconnecting the units with a connector 12 as previously described. Because the connector is sized to fit within the space occupied by a finished wall element, a connector may be mounted entirely on the face of a stud. If the supply and/or drain lines are positioned on either side of a stud, the units may be correspondingly connected on either side of the stud by inserting fasteners through the central apertures in the connector block and into the stud. If the supply and/or drain lines are positioned on one side of a stud, a second connector may be joined as previously described to the corresponding side of the housing to be positioned adjacent the stud, and the second connector 12 may be joined to the stud using fasteners through the connector central apertures.

A user may also install three or more units including frame and/or combination units in side-by-side relation using connectors as previously described to connect the units to each other and using additional alternate connector units as previously described to connect the units at the top, or the top and the bottom, to a top bracket or power bracket or to top and bottom brackets or power brackets.

A user may also install several units including frame and/or combination units in spaced-apart horizontal relation using alternate side brackets as shown in FIG. 14 to connect the units a desired distance apart. The units need not be equidistant, as the length of the brackets may be selectively trimmed to achieve any preferred spacing. Such spaced-apart connected units may be connected to a stud at one side, or they may be connected with two units on either side of a stud and a third unit connected to one of the units, or they may be connected to a bracket or power bracket.

Because each of the frame front wall sections 14*a* includes identical linear guide assembly structure 26, the frame unit 11 has no designated "top," "bottom," or "side" wall. In this manner, a supply line 2 or 3 or drain line 4 or combination of lines may be accessed via the frame opening 18 from above, below or either side of the frame unit.

A user may also install the frame units or the combination units prior to the rough-in plumbing installation, since the housing assembly 13 can be disengaged and rotated to orient the supply line openings in to accept the supply lines 2 and 3 from above, below, left or right.

It is to be understood that while certain forms of the modular housing system for plumbing have been illustrated and described herein, the system is not to be limited to the specific forms or arrangement of parts described and shown.

What is claimed is:

1. A modular support system for plumbing connections, the modular support system comprising:
   a frame having a frame body with an inner surface and an outer surface;
   a plurality of flanges extending outwardly from the outer surface of the frame body, each of the plurality of flanges having a forward surface;
   a plurality of rail assemblies disposed about the outer surface of the frame body, each of the plurality of rail assemblies including a first rail and a second rail;
   a connector engageable to the frame independent of an orientation of the frame, the connector having an connector body;
   a slide assembly disposed on the body of the connector, the slide assembly including a first boxway and a second boxway, a receipt of the first rail in the first boxway and the second rail in the second boxway forming a sliding joint between the frame and the connector; and
   a tab attached to the connector body at an attached end and extending to a free end such that the tab subtends an acute angle with the connector body in a projecting position, a contact by an adjacent flange of the plurality of flanges along a length of the tab during a forward movement of the connector body towards the frame body along the sliding joint displacing the tab in an inward direction towards the connector body, the tab automatically moving to the projecting position upon a cessation of the contact along the length of the tab during the forward movement, the free end of the tab contacting the forward surface of the adjacent flange when the connector and the frame are in a locked position, the locked position preventing rearward movement of the connector body away from the frame body.

2. The modular support system of claim 1, wherein the frame body is formed from a plurality of sides, each of the sides connected to an adjacent side at a corner.

3. The modular support system of claim 2, wherein each of the plurality of flanges is disposed at one of the corners.

4. The modular support system of claim 2, wherein each of the plurality of rail assemblies is disposed along one of the sides.

5. The modular support system of claim 1, wherein the frame body is symmetrical permitting engagement independent of the orientation of the frame.

6. The modular support system of claim 1, wherein the plurality of flanges are configured to engage a support member.

7. The modular support system of claim 6, wherein the support member includes at least one of a vertical wall stud or a bracket.

8. The modular support system of claim 1, wherein the connector body includes a first set of opposed sidewalls and a second set of opposed sidewalls connected by a front wall.

9. The modular support system of claim 8, wherein the tab is disposed at an intersection between the front wall and one of the first set of opposed sidewalls.

10. The modular support system of claim 9, wherein the slide assembly is disposed on one of the second set of opposed sidewalls.

11. The modular support system of claim 1, wherein the plurality of flanges are spaced equidistant from each other about the flange body and the plurality of rail assemblies are spaced equidistant from each other about the flange body.

12. The modular support system of claim 1, wherein the acute angle is ten degrees.

13. The modular support system of claim 1, wherein a web connects the first rail and the second rail and a guide separates the first boxway and the second boxway, the guide contacting the web when the connector and the frame are in the locked position.

14. The modular support system of claim 13, wherein the guide includes an indentation, the web receivable in the indentation in a coplanar relationship with a front wall of the connector body.

15. The modular support system of claim 1, wherein the first rail and the second rail each include a leg connected to the outer surface of the frame body and a rail flange extending transverse to the leg, the first boxway including a keeper plate, the keeper plate preventing a disengagement of the rail flange from the first boxway when the frame and the connector are in the locked position.

16. The modular support system of claim 1, wherein the frame includes a forward face receivable in a channel of a collar of a gasket, the gasket including a tubular sleeve configured to receive an outlet of a P-trap plumbing fitting in a sealing engagement.

17. The modular support system of claim 16, wherein the gasket is flexible.

18. The modular support system of claim 1, wherein a housing is engageable to the frame independent of the orientation of the frame such that an aperture defined in the housing is positioned in a selected orientation.

19. The modular support system of claim 18, wherein the selected orientation enables communication with a plumbing line independent of whether the plumbing line extends vertically or horizontally.

20. The modular support system of claim 18, wherein the aperture is one of a drain line aperture or a supply line aperture, the drain line aperture defined in the housing in an orthogonal relationship to the supply line aperture.

* * * * *